United States Patent [19]

Miller et al.

[11] Patent Number: 4,981,697
[45] Date of Patent: Jan. 1, 1991

[54] METHOD OF WEANING PIGLETS

[75] Inventors: Bill L. Miller, Fort Dodge; George W. Barr, Badger, both of Iowa

[73] Assignee: Land O'Lakes, Inc., Arden Hills, Minn.

[21] Appl. No.: 273,190

[22] Filed: Nov. 14, 1988

Related U.S. Application Data

[63] Continuation of Ser. No. 940,567, Dec. 12, 1986, abandoned.

[51] Int. Cl.$^5$ .............................................. A23K 1/00
[52] U.S. Cl. ................................... 426/2; 426/93; 426/96; 426/635; 426/807
[58] Field of Search .................. 426/2, 302, 309, 623, 426/635, 807, 93, 96

[56] References Cited

U.S. PATENT DOCUMENTS

| | | | |
|---|---|---|---|
| 1,796,031 | 3/1931 | Kent | 426/96 |
| 2,607,691 | 8/1952 | Bettman | 99/83 |
| 2,687,365 | 8/1954 | Link | 167/46 |
| 2,707,153 | 4/1955 | Bettman | 99/83 |
| 2,824,009 | 2/1958 | Lindow | 99/166 |
| 2,868,647 | 1/1959 | Vollink | 99/83 |
| 3,094,947 | 6/1963 | Green et al. | 107/54 |
| 3,184,316 | 5/1965 | Doan et al. | 99/83 |
| 3,318,706 | 5/1967 | Fast | 99/83 |
| 3,582,336 | 6/1971 | Rasmusson | 99/83 |
| 3,615,676 | 10/1971 | McKown et al. | 99/83 |
| 3,792,183 | 2/1974 | Lyall et al. | 426/307 |
| 3,840,685 | 10/1974 | Lyall et al. | 426/201 |
| 3,876,811 | 4/1975 | Bonner et al. | 426/93 |
| 3,959,498 | 5/1976 | Lyall et al. | 426/93 |
| 3,971,859 | 7/1976 | Huessy | 426/618 |
| 3,976,793 | 8/1976 | Olson et al. | 426/96 |
| 4,038,422 | 7/1977 | Keyser | 426/72 |
| 4,044,159 | 8/1977 | Lutz | 426/302 |
| 4,061,790 | 12/1977 | Cole, Jr. | 426/303 |
| 4,079,151 | 3/1978 | Schade et al. | 426/96 |
| 4,089,978 | 5/1978 | Lugay et al. | 426/32 |
| 4,089,984 | 5/1978 | Gilbertson | 426/293 |
| 4,101,680 | 7/1978 | Edwards | 426/96 |
| 4,104,406 | 8/1978 | Stringer et al. | 426/99 |
| 4,104,407 | 8/1978 | Stringer et al. | 426/99 |
| 4,162,336 | 7/1979 | Brown, Jr. et al. | 426/623 |
| 4,178,392 | 12/1979 | Gobble et al. | 426/96 |
| 4,211,800 | 7/1980 | Scharschmidt et al. | 426/93 |
| 4,212,896 | 7/1980 | Brown, Jr. et al. | 426/623 |
| 4,267,703 | 5/1981 | Minifie et al. | 62/123 |
| 4,338,339 | 7/1982 | Edwards | 426/96 |
| 4,379,171 | 4/1983 | Furda et al. | 426/291 |
| 4,409,250 | 10/1983 | Van Hulle et al. | 426/242 |
| 4,540,586 | 9/1985 | Moore | 426/69 |

FOREIGN PATENT DOCUMENTS 744834Q 7/1970 Belgium .
744854 7/1970 Belgium .

Primary Examiner—Marianne Cintins
Attorney, Agent, or Firm—Kinney & Lange

[57] ABSTRACT

A method of weaning piglets is disclosed wherein a coated feed, which coating has a maximum sucrose content of approximately 6%, is fed to piglets at least one week prior to weaning and the piglets are thereafter separated from the sows at which time the feed is continually fed to the piglets for at least oen week after weaning.

4 Claims, 1 Drawing Sheet

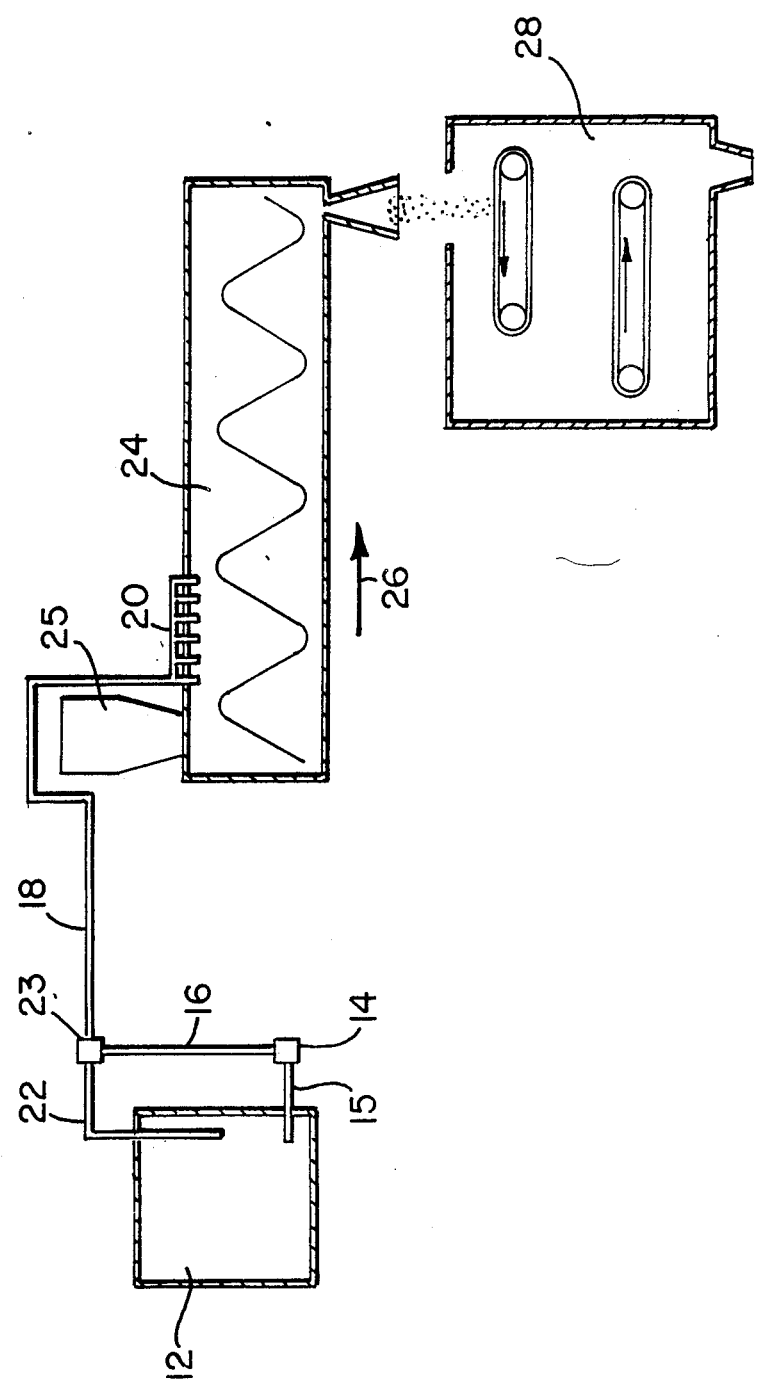

METHOD OF WEANING PIGLETS

This is a Continuation of application Ser. No. 940,567, filed Dec. 12, 1986 (now abandoned).

BACKGROUND OF THE INVENTION

1. Field of the Invention

The present invention relates to livestock feeds, in particular, it relates to enhancing palatability of livestock feed through a coating.

2. Description of the Prior Art

Agriculture, in recent years, has become extremely competitive with farmers having to closely monitor costs and increase productivity. A great deal of effort has been directed to increasing the nutritive content of livestock feeds so that livestock will be healthier, be more productive and/or gain weight faster. However, increasing the nutritive value of feed does not necessarily mean that livestock will find the feed more palatable and eat the desired quantity of feed. Often times, the feed must be made more palatable so that the desired effects of the feed come to pass.

One method that is well known for increasing palatability of food to both humans and animals is to include a sugar in the food. One prime example of increasing palatability of cereal-type foods is to provide a sugar coating on the cereal. Examples of coating compositions and methods for coating cereals are described in the following patents:

| Inventor | Pat. No. |
|---|---|
| Bettman | 2,607,691 |
| Bettman | 2,707,153 |
| Lindow | 2,824,009 |
| Vollink | 2,868,647 |
| Green et al | 3,094,947 |
| Doan et al | 3,184,316 |
| Fast | 3,318,706 |
| Rasmusson | 3,582,336 |
| McKown et al | 3,615,676 |
| Lyall et al | 3,792,183 |
| Lyall et al | 3,840,685 |
| Lyall et al | 3,959,498 |
| Olson et al | 3,976,793 |
| Keyser et al | 4,038,422 |
| Lutz | 4,044,159 |
| Cole, Jr. | 4,061,790 |
| Schade et al | 4,079,151 |
| Lugay et al | 4,089,978 |
| Gilbertson | 4,089,984 |
| Edwards | 4,101,680 |
| Stringer et al | 4,104,406 |
| Stringer et al | 4,104,407 |
| Gobble et al | 4,178,392 |
| Sharschmidt et al | 4,211,800 |
| Brown, Jr. et al | 4,212,896 |
| Minifie et al | 4,267,703 |
| Edwards | 4,338,339 |
| Furda et al | 4,379,171 |
| Van Hulle et al | 4,409,250 |
| Bonner et al | 4,876,811 |

One example of a process for coating a cereal is described in the Vollink U.S. Pat. No. 2,868,647. The Vollink Patent describes a process wherein a sugar solution is applied to the cereal body by simply pouring onto the cereal body the sugar solution as the cereal bodies are being tumbled in a horizontal rotating cylinder, with the sugar being distributed about the cereal bodies as they are tumbling. Such sugar solutions contain as little as 1% sugar or as much as 84%, if sucrose is the sugar of interest. The solution is kept at a temperature range of 230° F.–250° F. and air is circulated to dry the coated cereal, the air being kept on the order of 275° F.–350° F.

Another method of applying a sugar solution to produce a coating on a cereal is described in the Lyall et al U.S. Pat. Nos. 3,792,183, 3,840,685 and 3,959,489. The Lyall et al Patents describe a coating process wherein an 80% sugar solution is dripped onto cereal products in a Votator. The cereal products are then dried separately at 200° F.–260° F. from about 20–28 minutes in a vertical flow-type drier.

Sugar has also been incorporated into animal feed to entice animals to eat the feed. One such feed is disclosed in the Brown, Jr. et al U.S. Pat. 4,212,896 wherein fully-inverted molasses at 7½%–20% by weight is included in the feed. Another such feed is described in the Brown, Jr. et al U.S. Pat. 4,162,336 which includes 7½% to 15% of a monosaccharide included throughout the feed.

The Stringer et al U.S. Pat. Nos. 4,104,406 and 4,104,407 describe a process which coats an expanded animal food with a first layer of dextrin and a second layer of fat, which inhibits hydration of the food when water is added, thereby improving animal acceptance of the food.

The Lugay et al U.S. Pat. No. 4,089,978 describes a process of coating a dog food with a coating containing a reducing sugar, animal blood, yeast and fat with lipase and protase in about 1%–5% by weight of the animal food.

SUMMARY OF THE INVENTION

The present invention includes a process for enhancing the palatability to livestock of a dry pelletized feed. The process includes applying an approximately 73–85% sucrose solution to dry feed pellets to obtain a substantially uniformly coated pellet having a maximum sucrose content of about 6.0% by weight of the pellet. The sucrose solution is applied to the feed while the feed is in an agitated state. The feed is kept in an agitated state until the coating hardens to produce a free flowing coated product.

The present invention further includes a method of feeding livestock, and especially young livestock such as piglets. The method includes feeding the coated feed of the present invention at least one week prior to weaning. The method further includes continuing to feed the livestock for at least one week after weaning.

The present invention also includes a method of increasing weight gain by feeding the coated feed of the present invention to livestock.

BRIEF DESCRIPTION OF THE DRAWINGS

The FIGURE is a diagramatical view of a process of the present invention.

DETAILED DESCRIPTION OF THE PREFERRED EMBODIMENTS

The present invention includes a process for enhancing the palatability of a dry pelletized feed to livestock. The present invention also includes a method of feeding livestock, and in particular, feeding swine. Additionally, the present invention includes a method of increasing weight gain, in particular, of swine, and especially piglets.

Piglets, starting at two weeks of age, are fed the coated feed of the present invention and are continued on such feeding upon weaning, until at least four weeks of age. All references in the present application to percentage concentration are by weight.

The process includes applying an approximately 73-85% sucrose solution and preferably an approximately 80% sucrose solution to a dry pelletized feed such that a uniform coating is applied to the pelletized feed having a sucrose content of about 6.0% or less. The pelletized feed is coated in an agitated state until the coating hardens.

Referring to the FIGURE, a sucrose solution is contained in a mixing tank 12. The mixing tank 12 includes an impellor for keeping the sucrose solution mixed. Flavors are added to the solution. The solution in the mixing tank is a super saturated solution having a sucrose content in the range of 73-85% sucrose by weight and preferably a concentration of approximately 80% sucrose. The temperature of the sucrose solution is kept in a temperature range of 115° F. to 150° F. and preferably in a temperature range of 118° F. to 120° F. It is desirable to have as high a sucrose content as possible thereby reducing the amount of water to as little as possible. Water is needed to adhere the sucrose to the dry pellet, however, too much water would make the pellet too soft, and would give problems in drying the pellet.

The sucrose solution is transported from the mixing tank 12 by a circulating pump 14 and conduits 15, 16 and 18 to a plurality of dribble nozzles 20. A recirculation line 22 provides a return for excess sucrose solution that is not transported to the nozzles 20. A back pressure occurs in the line 18 due to the pumping action of the pump 14 against the nozzles 20, providing a constant pressure to the nozzles, resulting in a steady flow of solution through the nozzles 20. The excess of the solution is recirculated through line 22 back into the mixing tank 12. A valve 23 is provided to divert flow either back to the tank 12 or to the nozzles 20.

The sucrose solution is applied to a base feed in a mixing conveyor 24. The mixing conveyor 24 is an auger-type conveyor with the base feed being metered onto the auger from a hopper 25. The nozzles 20 drip the sucrose solution onto the base feed while the feed is being moved along the conveyor in the general direction of arrow 26 such that the solution is applied to the feed in an agitated state. The sucrose solution is applied at a rate so that the coated feed has a maximum of approximately 6.0% sucrose by weight with the sucrose being entirely within the coating. Although sucrose has been specifically mentioned, it will be understood that other sweeteners or sugars are includable within the present invention that produce an equivalent level of sweetness in the coating.

The base feed used in the present invention is a dry pelletized feed. The base feed is made of ground corn, soybean meal, dehulled rolled oats and dried whey. Feeds using other oilseeds, such as rapeseed, sunflower, cottonseed, peanut and flax seed, or other grains, such as maize, oats, sorghum, wheat, barley and the like, are also includable within the present invention. The feed also includes various additives such as L-Lysine, Animal Fat (preserved with BHA and citric acid), Dicalcium Phosphate, Calcium Carbonate, Manganous Oxide, Ferrous Sulfate, Copper Sulfate, Cobalt Carbonate, Zinc Oxide, Calcium Iodate, Sodium Selenite, Ethylenediamine Dihydriodide, Vitamin A Palmitate and Acetate, D-Activated Animal Sterol (source of Vitamin $D_3$), Vitamin E Supplement, Menadione Dimethylpyrimidionl Bisulfite (source of Vitamin K), Riboflavin, Niacin Supplement, Calcium Pantothenate, Choline Chloride, Vitamin $B_{12}$ Supplement, Ethoxyquin (a preservative) and natural and artificial flavor.

The dry feed in the present invention preferably has a moisture content of approximately 10-12%, and preferably the moisture content is approximately 10%. When the coating solution is applied, the coating adds another additional 1% moisture. However, the 1% moisture added by the coating is removed during subsequent drying of the coated product.

A sufficient amount of time for the coating to dry and harden is needed. Drying of the product is dependent on time, temperature and humidity. During this time, moisture from the coating is absorbed into the pellet, leaving a crystalline sucrose hard coating on the surface of the pellet. The coated feed is, for the most part, dried in the mixing conveyor 24 using ambient air. It has been found that ambient air in a range of 30° F. to 90° F. is sufficient to dry the product to a point so that the product is a free-flowing feed. However, since drying is not only time and temperature dependent, but also humidity dependent, it may be desirable to convey the product to an additional piece of apparatus such as a feed cooler 28. The feed cooler 28 is also operated at ambient temperature. The feed cooler 28 is well-known in the art and is used to add more drying time to insure proper drying and hardening of the coating prior to placing the feed in bags.

Once the coating has hardened, that is, the sucrose has crystallized on the surface of the feed pellet, the coated product has the same handling characteristics as a non-coated feed. In addition, the coated product of the present invention includes at least 20% fewer fines than a non-coated feed, the fines being incorporated into the sucrose solution when wet and affixed thereto as the moisture leaves the sucrose solution and the coating hardens. Incorporation of the fines into the coating is quite important since the base feed of the present invention includes fragmentized particles, the majority of which are 1-3 nm in diameter and made from a pelletized product. It will be appreciated that such type of a base feed includes a great amount of fines which are undesirable, both from a processing standpoint and from a yield standpoint.

The coating of the present invention was compared to a commercially-available non-coated product having essentially the same type of feed composition. The non-coated product and the coated product both have the following composition:

| | |
|---|---|
| Dehulled Rolled Oats | 10.7 |
| Ground Shelled Corn | 36.5 |
| Soybean Meal | 27.4 |
| Whole Dried Whey | 13.4 |
| Fat Base | 9.4 |
| Minerals, Vitamins & Antibiotic | 2.6 |
| | 100.0 |

The non-coated feed also included approximately 10% sucrose mixed with the above ingredients. The coated feed did not contain any sucrose within the feed, but only in the coating, the coated feed containing approximately 6% sucrose by weight.

In addition, the coated feed of the present invention included one-third less flavoring ingredients than the non-coated feed.

Both feeds were fed to piglets starting at two weeks of age and continuing on until four weeks of age when all the piglets were switched to an entirely different feed. At two weeks of age, the piglets were fed either the coated feed of the present invention or the non-coated feed on a per litter basis, with the litters being randomly chosen as to which feed was used. A total of 140 piglets were included in the first week of the trial. During the first week of this evaluation, the piglets were kept with the sows.

At three weeks of age, the piglets were ranked by weight as much as possible and assigned on that basis and on a sex basis to 24 individual pens along with the type of feed fed in the prior week. The 72 most uniformly weighted piglets were kept in the remainder of the trial, which included 36 piglets fed the coated feed during the first week and 36 piglets feed the non-coated feed during the first week.

The pens were divided into three blocks (horizontal location within a room) with each block containing four pens with two pens located at a top level and two pens located at a bottom level. Three blocks were located in one room (Room 1) of the nursery and three blocks were located in another room (Room 2) of the nursery. The coated and non-coated feeds were provided to the piglets in the following arrangement:

TABLE 1

| C = Coated N = Non-Coated | | Block 1 | | Block 2 | | Block 3 | |
|---|---|---|---|---|---|---|---|
| Room 1 | Top Level | 1C | 3N | 5N | 7C | 9C | 11N |
|  | Bottom Level | 2C | 4N | 6N | 8C | 10N | 12C |
| Room 2 | Top Level | 13C | 15N | 17N | 19C | 21C | 23N |
|  | Bottom Level | 14N | 16C | 18N | 20C | 22N | 24C |

Numbers Refer To Pen Numbers

The piglets were fed the non-coated or the coated feed for one week in their pens. Thereafter, all piglets were fed an entirely different non-coated feed for a four week period.

The average daily weight gain of the piglets in each pen was recorded, along with the daily feed intake in that pen. The data from the piglets in each pen being fed the coated feed was then averaged, along with the feed intake, and the daily weight gain of the piglets in each pen being fed the non-coated feed was also averaged along with the daily feed intake. An efficiency value was obtained by taking the value of the average daily feed intake and dividing that by the average daily weight gain.

The data was analyzed to determine whether location of the piglets at a top level pen versus a bottom level pen; horizontal location within each room (block); or whether the pens being located in different rooms had any effect on feed intake or daily weight gain. It was determined that location of the pens within the room (pen levels or block), had no significant effect on daily weight gain or daily feed intake. However, a room difference was found to be significant as it concerned weight gain and daily feed intake. Better ventilation in one room than the other was determined to be the cause of the difference between the two rooms. This difference was taken into account in evaluating the data.

The following tables include data on the average daily weight gain (ADG) (lbs. per head per day), the average daily feed intake (ADF) (lbs. per head per day) and an efficiency rating (F/G). The closer the efficiency rating is to 1.0, the more feed is translated into weight gain by the piglets.

TABLE 2

Data from the first week of the trial.
(first week after weaning)

| | Feed | |
|---|---|---|
| | Non-Coated | Coated |
| Room 1 | ADG .32 | ADG .41 |
| | ADF .40 | ADF .45 |
| | F/G 1.25 | F/G 1.10 |
| Room 2 | ADG .25 | ADG .31 |
| | ADF .31 | ADF .36 |
| | F/G 1.24 | F/G 1.16 |
| Average | ADG .29 | ADG .36 |
| | ADF .35 | ADF .41 |
| | F/G 1.24 | F/G 1.14 |

TABLE 3

Data collected from three weeks of age (second week of trial) to eight weeks of age, with the piglets being fed the same feed (non-coated) after four weeks of age.

| | Feed | |
|---|---|---|
| | Non-Coated | Coated |
| Room 1 | ADG .87 | ADG .98 |
| | ADF 1.30 | ADF 1.38 |
| | F/G 1.50 | F/G 1.42 |
| Room 2 | ADG .82 | ADG .85 |
| | ADF 1.18 | ADF 1.20 |
| | F/G 1.44 | F/G 1.44 |
| Average | ADG .85 | ADG .91 |
| | ADF 1.24 | ADF 1.29 |
| | F/G 1.47 | F/G 1.41 |

As clearly shown in Tables 2 and 3, the piglets preferred the coated feed of the present invention as compared to the non-coated feed. Surprisingly, the coated feed was chosen, although the non-coated feed had a higher sucrose content, 10%, as compared to 6% of the present invention.

A further result of the trial, as is shown in Tables 2 and 3, is that piglets fed the coated feed of the present invention had a higher average daily weight gain (ADG).

A still further surprising result that is shown in Tables 2 and 3 is the higher feed efficiency (F/G) of the coated feed of the present invention as compared to the non-coated feed. Of particular interest are the results of Table 3, which show that even though all of the piglets were fed the same non-coated feed at age week four through age week eight, the piglets that were originally fed the coated feed of the present invention continued their more efficient feed usage. Applicants do not understand this phenomena except that the data of Table 3 shows a statistical difference between average daily weight gain (ADG) and feed efficiency usage (F/G) between the two feeds that are compared in the table.

TABLE 4

Average daily gain of piglets offered coated or non-coated feed during one week prior to separation from sow and first day after separation from sow.

| | Starter | |
|---|---|---|
| Item | Non-Coated | Coated |
| ADG, lb. One Week Prior to Separation | .48 | .54 |
| First Day After | −.49 | −.33 |

TABLE 4-continued

Average daily gain of piglets offered coated or non-coated feed during one week prior to separation from sow and first day after separation from sow.

| Item | Starter | |
|---|---|---|
| | Non-Coated | Coated |
| Separation | | |

Table 4 shows a further added feature of feeding piglets the coated feed of the present invention. In Table 4, the average daily weight gain during the week prior to separation from the sow (weaning), the piglets fed the coated feed of the present invention gained more than one-half pound while piglets fed the non-coated feed gained slightly less than one-half pound. The data of particular interest is the first day after separation from the sow. The piglets fed the nor-coated feed lost almost one-half pound while the piglets that were fed the coated feed lost approximately one-third pound. The first day after weaning presents a traumatic experience to the piglets. However, piglets fed the coated feed of the present invention lose significantly less weight during this first day.

The coated feed of the present invention showed an average daily feed intake that was a 38.6% improvement over the average daily feed intake of the non-coated feed. Table 5, set forth below, shows data collected from approximately two weeks of age to weaning which occurs at three weeks of age.

TABLE 5

| | Non-Coated Feed | Coated Feed |
|---|---|---|
| Number of sows/litters evaluated | 59 | 54 |
| Feed Consumption (gm/piglet/day) | 32.27 | 44.75 |

TABLE 5-continued

| | Non-Coated Feed | Coated Feed |
|---|---|---|
| Improvement (%) | — | 38.60 |

In a further comparison of the coated feed of the present invention to the non-coated feed, a three-day intake of ten three-week old weaned swine was recorded. The swine were offered a choice of consuming the coated feed of the present invention or the non-coated feed. As clearly indicated in Table 6 set forth below, the young swine clearly prefer the coated feed of the present invention.

TABLE 6

| | 3-Day Intake (lbs) | Ratio |
|---|---|---|
| Coated Feed | 104.4 | 1:1.51 |
| Non-Coated Feed | 69.1 | |

Although the present invention has been described with reference to preferred embodiments, workers skilled in the art will recognize that changes may be made in form and detail without departing from the spirit and scope of the invention.

What is claimed is:

1. A method of forced weaning of piglets comprising:
   feeding a coated feed to a piglet at least one week prior to weaning during which time the piglet has access to the sow, the coated feed having a maximum sucrose content of approximately six percent by weight and wherein substantially all of the sucrose is in the coating; and
   separating the piglet from the sow after at least one week of feeding the coated feed and continuing the feeding of the coated feed for at least one week after weaning.

2. The method of claim 1 wherein the feeding of the coated feed is continued for three weeks after separation from the sow and discontinued thereafter.

3. The method of claim 1 wherein the coated feed is fed to the piglets starting at two weeks of age.

4. The method of claim 3 wherein the piglets are separated from the sow at three weeks of age.

* * * * *